(12) United States Patent
Ortbauer (10) Patent No.: US 12,297,075 B2
(45) Date of Patent: May 13, 2025

(54) REGISTRATION OF USERS OF A PASSENGER TRANSPORT SYSTEM

(71) Applicant: Inventio AG, Hergiswil (CH)

(72) Inventor: Martin Ortbauer, Vienna (AT)

(73) Assignee: INVENTIO AG, Hergiswil (CH)

( * ) Notice: Subject to any disclaimer, the term of this patent is extended or adjusted under 35 U.S.C. 154(b) by 964 days.

(21) Appl. No.: 17/309,543

(22) PCT Filed: Dec. 2, 2019

(86) PCT No.: PCT/EP2019/083283
§ 371 (c)(1),
(2) Date: Jun. 4, 2021

(87) PCT Pub. No.: WO2020/126434
PCT Pub. Date: Jun. 25, 2020

(65) Prior Publication Data
US 2022/0024718 A1   Jan. 27, 2022

(30) Foreign Application Priority Data

Dec. 21, 2018   (EP) ..................................... 18215792

(51) Int. Cl.
*G01S 17/00* (2020.01)
*B66B 1/34* (2006.01)
(Continued)

(52) U.S. Cl.
CPC ............ *B66B 1/3476* (2013.01); *B66B 25/00* (2013.01); *G01S 17/894* (2020.01)

(58) Field of Classification Search
USPC ......................................................... 356/5.01
See application file for complete search history.

(56) References Cited

U.S. PATENT DOCUMENTS

| | | | |
|---|---|---|---|
| 4,706,227 A | 11/1987 | DuVall et al. | |
| 5,923,005 A | 7/1999 | Blondiau et al. | |

(Continued)

FOREIGN PATENT DOCUMENTS

| | | | |
|---|---|---|---|
| CN | 1054844 A | 9/1991 | |
| CN | 1867513 A | 11/2006 | |

(Continued)

*Primary Examiner* — James R Hulka
(74) *Attorney, Agent, or Firm* — William J. Clemens; Shumaker, Loop & Kendrick, LLP (57) ABSTRACT

A passenger transport system has a device for registering users in a pass-through zone and the device includes at least two sensors, which sensors operate in accordance with the time-of-flight measurement principle, and a signal evaluation unit. Each sensor includes an emitter emitting electromagnetic waves into a detection area and a receiver, arranged adjacent to the emitter, that acquires the electromagnetic waves that were emitted by the emitter and reflected from the detection area, wherein the emitter and the receiver of each sensor are directed into the pass-through zone. At least one sensor of the device is respectively arranged on opposing sides of the pass-through zone and the principal direction axes of the detection areas of the sensors are arranged parallel to one another and orthogonal to the longitudinal extent of the pass-through zone.

10 Claims, 3 Drawing Sheets (51) Int. Cl.
*B66B 25/00* (2006.01)
*G01S 17/894* (2020.01)

(56) References Cited

U.S. PATENT DOCUMENTS

| | | | |
|---|---|---|---|
| 7,140,469 B2 | 11/2006 | Deplazes et al. | |
| 2003/0179127 A1 | 9/2003 | Wienand | |
| 2006/0037818 A1* | 2/2006 | Deplazes | G08B 13/19647 |
| | | | 187/316 |
| 2018/0307913 A1* | 10/2018 | Finn | G06V 20/53 |

FOREIGN PATENT DOCUMENTS

| | | |
|---|---|---|
| CN | 101964053 A | 2/2011 |
| CN | 203173669 U | 9/2013 |
| CN | 103663084 A | 3/2014 |
| CN | 105731233 A | 7/2016 |
| CN | 105829236 A | 8/2016 |
| CN | 108217410 A | 6/2018 |
| DE | 19817396 A1 | 10/1999 |
| EP | 1345445 A1 | 9/2003 |
| EP | 1541519 A1 | 6/2005 |
| JP | 2008174348 A | 7/2008 |
| JP | 2011011901 A | 1/2011 |
| JP | 2013056735 A | 3/2013 |
| JP | 2014015306 A | 1/2014 |
| JP | 2014105076 A | 6/2014 |
| JP | 5811934 B2 | 11/2015 |
| WO | 03091955 A1 | 11/2003 |
| WO | 2015090764 A1 | 6/2015 |

\* cited by examiner

REGISTRATION OF USERS OF A PASSENGER TRANSPORT SYSTEM

FIELD

The invention pertains to a passenger transport system with a device for registering users, as well as to a method for registering users of this passenger transport system with a corresponding device.

BACKGROUND

Passenger transport systems such as elevators, escalators and moving walkways particularly are used in urban areas in order to direct and maintain the dynamic of passenger flows. Due to the global population growth and the increasing concentration in urban areas, the number of users of a passenger transport system to be transported per time unit also increases accordingly, particularly in public buildings such as railway stations, airports and subway stations.

Since the number of users being transported also represents the measure for the wear of expendable parts such as guide rollers, sliding elements, supporting elements, drive components and the like, a service date can be calculated based on a registration of user numbers with consideration of empirical values. With respect to heavily used passenger transport systems, it may furthermore be advantageous to register the number of users located on the passenger transport system for safety reasons in order to initiate corresponding safety measures in case of an overload.

Consequently, there is a need for equipping passenger transport systems with a device for registering users. A passenger transport system of this type is known, for example, from JP 2011 011901 A. In this passenger transport system, the entering and exiting users are registered by means of light barriers arranged on both access areas of the escalator and the instantaneous load on the step band is calculated from the difference. Although four light barriers are installed per access area for reasons of redundancy, the device is unable to register whether only one person enters the access area or two persons enter the access area adjacent to one another.

Another device for registering users is known from WO 2015/090764 A1. In this case, the device has the function of monitoring a pre-entry area of an escalator by means of a TOF sensor (time-of-flight camera). As soon as a user enters this pre-entry area, the motion pattern of the user is analyzed and the drive of the transport band is controlled in accordance with this analysis.

In passenger transport systems with sensors of the aforementioned type, the image analysis requires a signal evaluation unit with high computing power, as well as relatively expensive high-resolution sensors, in order to obtain meaningful results. In addition, these systems reach their limits starting at a certain user density because the boundaries between moving users, who are tightly crammed together, are blurred for the sensors and the users appear as a nearly homogenous moving block.

SUMMARY

Consequently, the invention is based on the objective of making available a passenger transport system with a device for registering users, as well as a method for registering users by means of this device, wherein said device allows the use of simple and inexpensive sensors, which require little computing capacity for the evaluation of the sensor signals, and also provides an exact user count when the users are tightly crammed together.

This objective is attained by means of a passenger transport system with a device for registering users, wherein the passenger transport system has a zone, through which the users can pass. The device comprises at least two sensors that operate in accordance with the time-of-flight measurement principle and at least one signal evaluation unit that is connected to these sensors. Each sensor comprises at least one emitter for emitting electromagnetic waves into a detection area and a receiver, which is arranged adjacent to the emitter and serves for acquiring the electromagnetic waves that were emitted by the emitter and reflected from the detection area of the sensor. The emitter and the receiver of each sensor are directed into the pass-through zone. The detection area of each sensor is a three-dimensional space that has a principal direction axis.

The time-of-flight measurement of the sensors makes it possible to detect the presence of a user, as well as the distance of this user from the detecting sensor. The number of simultaneously registered users can be determined from the detected distances of opposing sensors by means of an evaluation in the form of a comparison of the distance signal profiles. In other words, any type of inexpensive and simple sensors can be used as long as they are capable of measuring a distance from a passing user or object. The distance signal profiles of these sensors can be evaluated to the effect whether only one user or two adjacently walking users simultaneously enter the access area as described in greater detail below in connection with the figures. No elaborate image processing programs and therefore no significant computing and data storage resources are required for this purpose.

The detection area of a sensor usually is a three-dimensional conical space that has a cone axis. In other words, the detection area may be a rotationally symmetrical, three-dimensional conical space, the cone axis of which is the optical axis of the receiver. However, the broader term "principal direction axis" is used instead of the term "optical axis" because there are many different types of sensors that operate based on the time-of-flight measurement principle, but do not necessarily require an optical system.

In other words, the detection area is characterized by a principal direction axis, wherein the electromagnetic waves of the emitter being emitted into the detection area are reflected by surfaces present in the detection area and can be acquired by the receiver. Since only the distance signal is of interest in the present invention, not only the still quite expensive TOF cameras with image processing software can be used as sensors, but also very inexpensive sensors that only measure a distance from surfaces in the pass-through zone continuously or periodically along a line in space, specifically along the principal direction axis, and transmit this distance to the signal evaluation unit in the form of a signal or signal profile.

According to the invention, at least one sensor of the device is respectively arranged on opposing sides of the pass-through zone, wherein the principal direction axes of the detection areas of the sensors are arranged parallel to one another and orthogonal to the longitudinal extent of the pass-through zone.

One particular advantage of the aforementioned orientation of the principal direction axes of the sensors relative to one another and to the longitudinal extent of the pass-through zone can be seen in the very simple, functionally reliable and fast evaluation of the sensor signals because the signal profiles of the sensors do not have to be corrected or only marginally corrected in relation to one another in order to arrive, for example, at the comparison of signal patterns described further below due to the parallelism and orthogonality.

Due to the aforementioned arrangement, the two opposing sensors can detect a user present in the pass-through zone in an at least partially simultaneous manner. In this case, the time-of-flight measurement particularly also detects the respective distance of users passing and/or riding through the pass-through zones from the corresponding sensor. The distances measured as a function of the time result in a signal profile of the sensors that is much easier to evaluate, for example, than images acquired by a camera, which have to be processed, e.g., by means of a 3D-capable image processing program. The evaluation accordingly requires significantly less computing power and data storage resources such that the evaluation of the simple distance signal profile or sensor signal can take place at lightning speed.

In order to prevent users from forming a compact block, the width of the zone of the passenger transport system, through which the users can pass, may be limited to two users standing adjacent to one another in the region of the sensors.

The aforementioned passenger transport system may be realized, for example, in the form of an escalator or a moving walkway, wherein the pass-through zone is laterally bounded by balustrades and the sensors are arranged on or in these balustrades. The balustrades may have a revolving handrail belt in this case. The balustrades extend laterally along a transport band with steps or pallets, which is arranged in a revolving manner in the pass-through zone in order to transport the users. However, the balustrades may also be realized in the form of elements such as posts, banisters or railings, which are arranged upstream of the balustrades provided with the revolving handrail and serve for directing the users onto the escalator or the moving walkway.

However, the passenger transport system may also be realized in the form of an elevator. In this case, the pass-through zone is laterally bounded by a shaft door frame and/or a car door frame of the elevator. The sensors preferably are arranged on or in these door frames.

Depending on the arrangement of the two sensors, the acquisition of the sensor signals or the mode of operation of the sensors respectively has to be adapted to the specific arrangement. For example, the detection areas of opposing sensors may be positioned congruent with one another. The emission of electromagnetic waves by the emitters of the sensors may be offset relative to one another in time in order to prevent the sensors from interfering with one another.

According to another option, the detection areas of opposing sensors are positioned offset relative to one another and the emission of electromagnetic waves by the emitters of the sensors takes place simultaneously.

In another variation, the detection areas of opposing sensors may be positioned congruent with one another and the emission of electromagnetic waves by the emitters of the sensors may take place simultaneously. However, the electromagnetic waves have to differ from one another with respect to their frequency in this case and the receivers have to comprise filters that are adapted in accordance with the frequency to be received.

As already mentioned above, the times-of-flight of the electromagnetic waves, which are emitted and once again received by two opposing sensors, are detected by the sensors and forwarded to the signal evaluation unit in the form of sensor signals. The signal patterns created by the signal profile can be analyzed in relation to a basic signal in the signal evaluation unit in that the number of simultaneously registered users can be determined from the detected distances of the opposing sensors by means of an evaluation in the form of a comparison of the distance signal profiles, wherein a counter value of a counting unit of the signal evaluation unit is changed in dependence on the analyzed signal patterns.

This can be achieved, for example, in that the analysis of the signal patterns is carried out by comparing the rising and/or falling sections of the two signal profiles to an upper threshold range, to a medial threshold range and to a lower threshold range starting from the basic signal. In other words, the analysis concerns the sections of the signal profile, which effect a penetration into a threshold range. Since the medial threshold range is penetrated up to the lower threshold range depending on the signal profile, the signal evaluation unit preferably waits for the rising section before the counter value is determined in accordance with the threshold range reached.

In an embodiment of the invention, the counter value of the counting unit may in dependence on the comparison be
  increased by one if the first of the two sensor signals reaches the upper threshold range and the second of the two sensor signals reaches the medial or lower threshold range;
  increased by one if the first and the second sensor signal reach the medial threshold range; or
  increased by two if the first and the second sensor signal reach the lower threshold range.

In another embodiment of the invention, a pattern recognition algorithm may be executed in the signal evaluation unit, wherein the signal patterns of two opposing sensors created by the signal profile are analyzed in relation to the basic signal by means of said pattern recognition algorithm. Such a pattern recognition algorithm compares signal profile sections, which are defined by sections of the basic signal, with a certain stored signal pattern. A numerical value is assigned to this stored signal pattern. The counter value of the counting unit is subsequently increased by this numerical value. It is obvious that very many different patterns exist due to the speed with which the users pass the sensors, as well as due to the shape of the users themselves. In order to cover this variety, these patterns can be analyzed by a machine learning algorithm. The pattern recognition algorithm may be designed similar to algorithms used for optical character recognition (OCR).

Furthermore, a pattern comparison algorithm may also be executed in the signal evaluation unit. If the signal profile section deviates from the already stored signal patterns, the deviating signal profile section can likewise be stored as a signal pattern. A numerical value is subsequently assigned to this signal pattern such that this numerical value is used for increasing the counter value of the counting unit if this signal pattern once again corresponds to the signal profile.

For example, wear values determined in tests may be periodically taken as a basis for the existing counter value such that the remaining service life of expendable parts such as bearings, rollers, chains, belts, guides and the like of the respective passenger transport system can be determined from the existing counter value.

DESCRIPTION OF THE DRAWINGS

Passenger transport systems with a device for registering users, as well as a method for registering users of this passenger transport system by means of the corresponding device, are described in greater detail below on the basis of examples and with reference to the drawings, wherein identical components are identified by the same reference symbols in all figures. In these figures.

DETAILED DESCRIPTION

Figure 1:
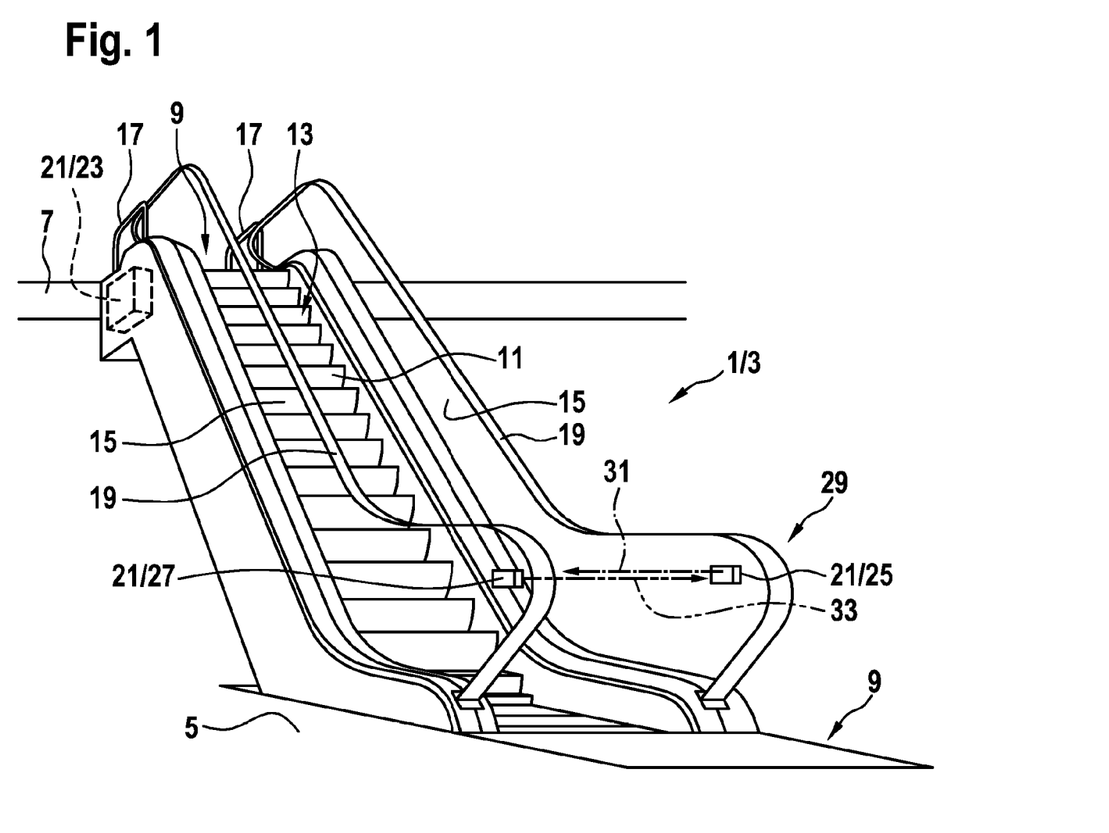
FIG. 1 shows a schematic three-dimensional view of a passenger transport system in the form of an escalator, in which sensors of the device are arranged in the balustrades.

FIG. 1 shows a schematic three-dimensional view of a passenger transport system 1 in the form of an escalator 3. This escalator connects a lower floor 5 of a building to an upper floor 7 of the building. The escalator 3 respectively has an access area 9 on each of the floors 5, 7. A revolving transport band 11 extends between the access areas 9. The access areas 9, as well as the transport belt 11, are walkable and therefore form part of a pass-through zone 13, which is bounded by balustrades 15 on both of its longitudinal sides. These balustrades 15 have a revolving handrail 19, the speed of which is adapted to the speed of the transport band 11. In addition, two railings 17 are connected to the balustrades 15 on the upper floor 7 such that the pass-through zone 13 is extended by these railings 17.

The passenger transport system 1 according to FIG. 1 is equipped with a device 21 for registering users. This device 21 particularly comprises a signal evaluation unit 23, as well as at least two opposing sensors 25, 27. In the present exemplary embodiment, one of the sensors 25, 27 is respectively arranged in a deflection area 29 of the handrail 19. The two sensors 25, 27 respectively have a principal direction axis 31, 33 as indicated with the dot-dash and double dot-dash arrows. The two sensors 25, 27 in the balustrades 15 are oriented in such a way that their principal direction axes 31, 33 extend parallel to one another and orthogonal to the longitudinal extent of the pass-through zone 13. Two sensors 25, 27 naturally may also be arranged in the access area 9 on the upper floor 7, for example in the balustrades 15, but also in the two railings 17. These pairs of sensors 25, 27 also have to be oriented relative to one another in accordance with the invention as already described above.

No connecting lines and connecting means between the signal evaluation unit 23 and the sensors 25, 27 are illustrated in order to provide a better overview. The supply with electrical energy and the various types of wire-bound or wireless signal transmissions are sufficiently known and therefore not illustrated and described in greater detail.

Figure 2:
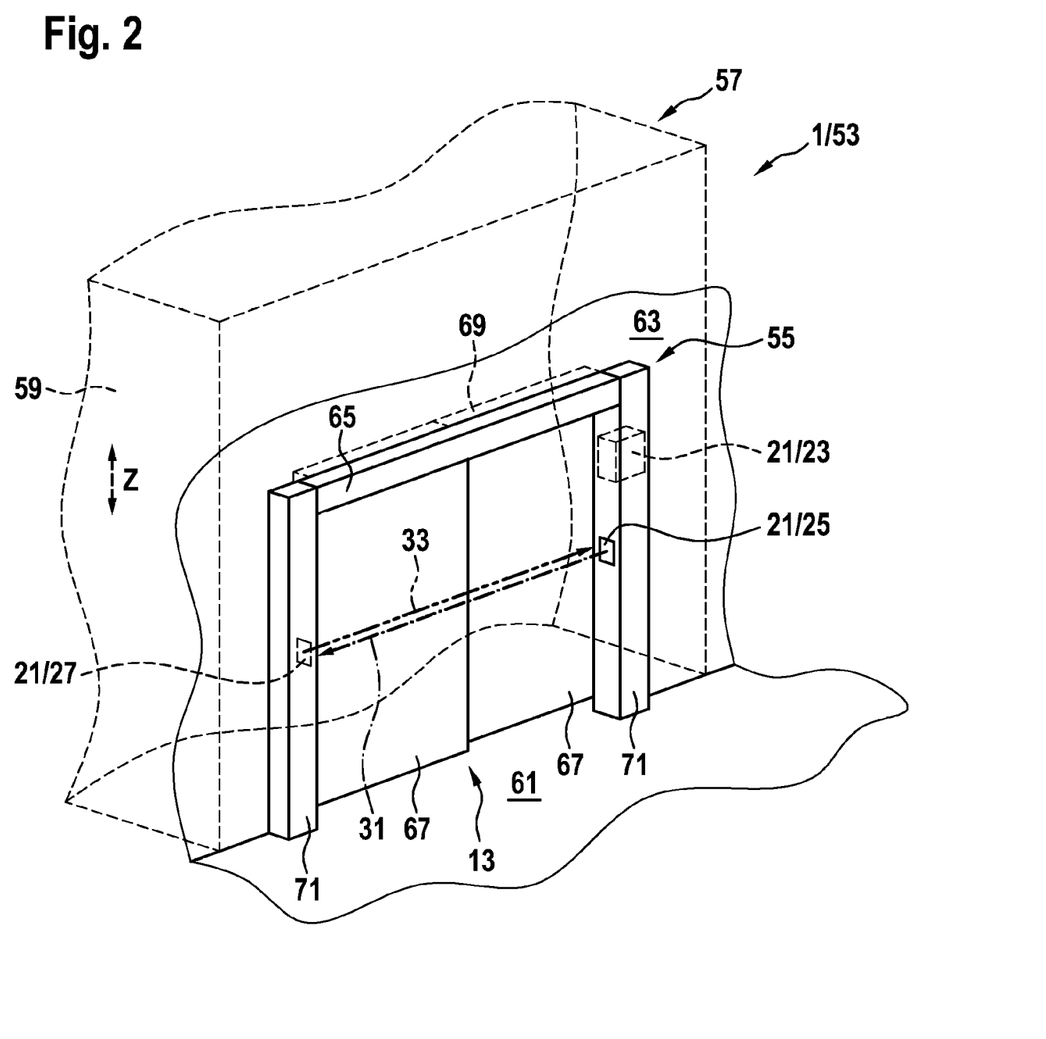
FIG. 2 shows a schematic three-dimensional view of a shaft door of a passenger transport system in the form of an elevator, in which sensors of the device are arranged in the door frame.

FIG. 2 shows a schematic three-dimensional view of part of a floor 61 of a building 63 with multiple floors. A shaft door 55, which forms part of a passenger transport system 1 in the form of an elevator 53, is arranged in the wall of the building 63.

The shaft door 55 closes an elevator shaft 57 of the building 63 with multiple floors relative to the floor 61. An elevator car 59, which can be displaced in the elevator shaft 57 in the vertical direction Z, is partially indicated behind the shaft door 55 with broken lines. Other elements of the elevator 53, particularly additional floors 61 and shaft doors 55 provided on these floors, are not illustrated because only the arrangement of the elements of the device 21 for registering users in the region of the shaft door 55, which was already described in connection with FIG. 1, is relevant for the registration of users.

The shaft door 55 has a door frame 65, in which two door leaves 67 are arranged in a movable manner. The door leaves 67 may be conventionally coupled to a not-shown door drive. In addition, the elevator car 59 may comprise the car door 69 indicated with broken lines and a door drive as it has been common practice for years in the construction of elevators. In such elevators 53, the door leaves 67 of the shaft doors 55 are temporarily coupled to the car doors 69 in order to open and close the doors. The pass-through zone 13 is bounded by the door frame 65 when the shaft door 55 is opened.

According to FIG. 2, the device 21 for registering users is arranged in the door frame 65. The signal evaluation unit 23 indicated with broken lines is accommodated in a cavity of the door frame 65. The two sensors 25, 27 are fitted into the two door posts 71 of the door frame 65 opposite of one another, wherein the principal direction axes 31, 33 of said sensors are in this case also arranged parallel to one another and orthogonal to the longitudinal extent of the pass-through zone 13. If the sensors 25, 27 are arranged in the door frame 65 of the shaft door 55 as it is case in the present example, each door frame 65 on every floor 61 preferably is equipped with sensors 25, 27. The signal evaluation unit 23 may also be accommodated in one or in both sensors 25, 27, but a data exchange between the sensors 25, 27 has to be possible in this case. The signal evaluation unit 23 naturally may also be arranged centrally, for example in a not-shown control of the passenger transport system 1, such that all sensors 25, 27 of the device 21 transmit their signals to this one signal evaluation unit 23.

The sensors 25, 27 and the signal evaluation unit 23 naturally may also be accommodated in the elevator car 59, wherein the sensors 25, 27 accordingly are arranged in the region of the car door 69 in order to monitor the pass-through zone 13, which is laterally bounded by the opened car door 69.

The data acquired by the signal evaluation unit 23 may be forwarded, for example, to the control of the passenger transport system 1 and additionally processed therein. In this way, certain control steps can also be carried out by the control of the passenger transport system 1 in dependence on the evaluated sensor signals 85, 87 (see FIG. 3B). In an elevator 53, for example, the control can adapt the acceleration profile and the deceleration profile of the not-shown elevator drive in dependence on the number of users who have entered the elevator car and therefore in dependence on the load to be transported.

The data acquired by the signal evaluation unit 23 may also influence the control steps of the control in a passenger transport system 1 in the form of an escalator 3 or moving walkway such that, for example, an acoustic warning signal is output or the moving speed of the transport band 11 is throttled during an excessive onrush of users.

However, the data acquired by the signal evaluation unit 23 may also be transmitted to and evaluated by a central computer of the operator of the passenger transport system 1, the company responsible for servicing the passenger transport system or a virtual computer network (cloud), for example via an Internet connection. It would be particularly interesting to incorporate the data into a digital image (digital twin) of the passenger transport system 1 such that load simulations and therefore wear simulations can be carried out with the digital image as simulation environment based on the number of registered users and a standard user mass (usually 85 kg).

Figure 3A:
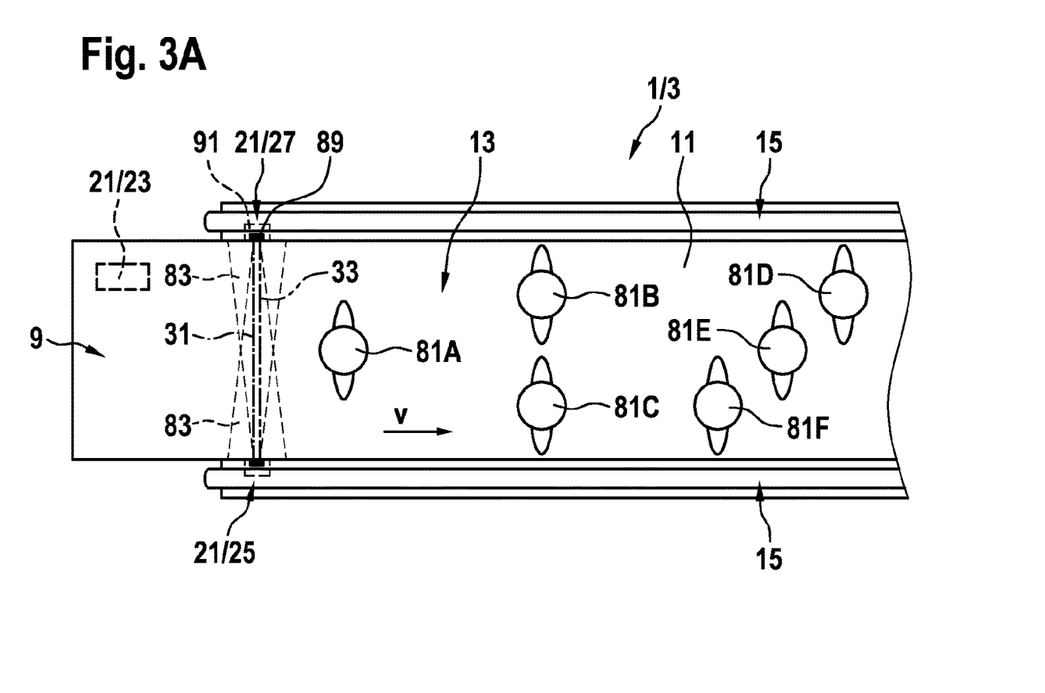
FIG. 3A shows a schematic top view of the escalator illustrated in Figure with users.
Figure 3B:
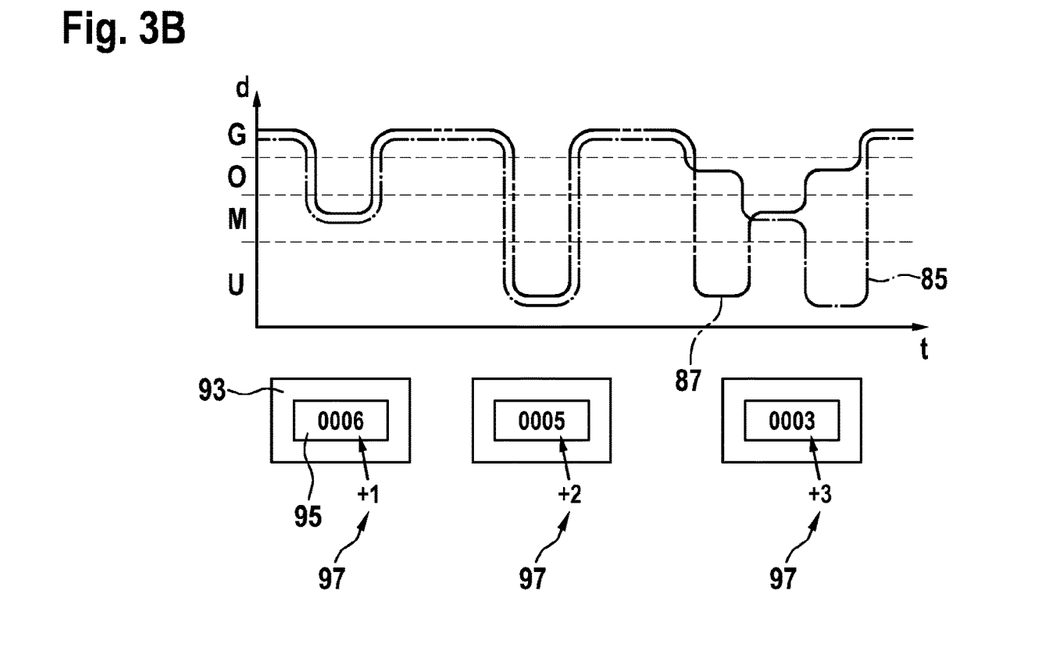
FIG. 3B schematically shows the respective signal profiles of the sensors of the device in dependence on the positions of the users in the pass-through zone illustrated in FIG. 3A, as well as counting units of a signal evaluation unit of the device.

FIGS. 3A and 3B are described collectively below, wherein FIG. 3A shows a schematic top view of the escalator 3 illustrated in FIG. 1 with users 81A-81F.

FIG. 3B schematically shows the respective signal profiles of the sensor signals 85, 87, which were detected by the sensors 25, 27 of the device 21 and forwarded to the signal evaluation unit 23. In this case, the signal profile of the sensor signals 85, 87 changes in dependence on the distance of the users 81A-81F, who are located in the pass-through zone 13 as illustrated in FIG. 3A, from the sensors 25, 27.

Since the sensors 25, 27 operate in accordance with the time-of-flight measurement principle, the sensor signals 85, 87 represent the measured distances from the surfaces detectable in the detection areas 83 of the sensors 25, 27. Each sensor 23, 25 comprises at least one emitter 91 for emitting electromagnetic waves into the detection area 83 and a receiver 89, which is arranged adjacent to the emitter 91 and serves for acquiring the electromagnetic waves that were emitted by the emitter 91 and reflected from the detection area 83 of the sensor 25, 27. The emitter 91 and the receiver 89 of each sensor 25, 27 are directed into the pass-through zone 13.

The detection range 83 of each sensor 25, 27, shown with a dotted line, is a three-dimensional, conical space that has a cone axis. In other words, the detection range 83 can be a rotationally symmetric, conical three-dimensional space, whose cone axis is the optical axis of the receiver 89. Since there are many different sensor types that work with the time-of-flight measurement principle but do not necessarily require optical means, the broader term main direction axis 31, 33 is used instead of the term "optical axis".

In other words, the detection range 83 is characterized by a main direction axis 31, 33, wherein the electromagnetic waves of the emitter 91, emitted in the detection range 83 are reflected from existing surfaces in the detection area 83 and can be received by the receiver 89.

The sensor 25, 27 specifically may be realized, for example, in the form of a 3D camera. The 3D camera used may be based on the time-of-flight measurement principle ("Time of Flight"). The 3D camera has an emitter 91 in the form of a light-emitting diode or laser diode unit that emits light, for example, in the infrared range, wherein the light is emitted in short pulses (with a length of several 10 nanoseconds). The 3D camera furthermore comprises a receiver 89 in the form of a photocell array that is composed of a number of light-sensitive elements. The photocell array is connected to a processor chip (e.g. a CMOS sensor chip) that defines the time-of-flight of the emitted light. The processor chip simultaneously measures the distance from a number of targets in space in a few milliseconds.

The 3D camera may also be based on a distance measurement principle, in which the time-of-flight of the emitted light is measured as a function of the phase of the light. In this case, the phase positions during the emission and the reception of the light are compared and the elapsed time or the distance from the reflecting object respectively is determined thereof. To this end, it is preferred to emit a modulated light signal instead of short light pulses. Further details on measurement principles are provided, for example, in the following publications: "Fast Range Imaging by CMOS Sensor Array Through Multiple Double Short Time Integration (MDSI)," P. Mengel et al., Siemens AG, Corporate Technology Department, Munich, Germany, and "A CMOS Photosensor Array for 3D Imaging Using Pulsed Laser," R. Jeremias et al., 2001 IEEE International Solid-State Circuits Conference, page 252. A person skilled in the art can easily see that another device for determining the object distance, e.g. a device that is based on electromagnetic waves in the radio wavelength range (radar), may also be used as an alternative to such a 3D camera.

The most inexpensive sensors 25, 27 possible should be used as already mentioned initially. A receiver 89 in the form of a photocell already suffices because only the distance from surfaces is of interest. Accordingly, virtually only one image element is evaluated such that the data to be processed is significantly reduced and it is therefore possible to use inexpensive sensors 25, 27 and signal evaluation units 23. This reduction of the data volume furthermore leads to a significantly higher processing speed within the entire device 21 for registering users 81A-81F. This means that not only the still quite expensive TOF cameras with image processing software can be used as sensors 25, 27, but also very inexpensive sensors 25, 27 that only measure a distance from surfaces in the pass-through zone 13 continuously or periodically along a line in space, specifically along the principal direction axis 31, 33, and transmit this distance to the signal evaluation unit 23 in the form of a sensor signal 85, 87 or signal profile.

Since the invention proposes that at least one sensor 25, 27 of the device 21 is respectively arranged on opposing sides of the pass-through zone 13 and the principal direction axes 31, 33 of the detection areas 83 of the sensors 25, 27 are arranged parallel to one another and orthogonal to the longitudinal extent of the pass-through zone 13, the signal profiles of the sensor signals 85, 87 of the type illustrated in FIG. 3B can be processed without any problems in the signal evaluation unit 23 and compared to one another. This is achieved in that the signal profiles of the sensors 25, 27 do not have to be corrected or only marginally corrected in relation to one another in order to arrive, for example, at the comparison described further below due to this specific orientation of the sensors 25, 27.

Depending on the arrangement of the two sensors 25, 27, the acquisition of the sensor signals 85, 87 or the mode of operation of the sensors 25, 27 respectively has to be adapted to the specific arrangement. For example, the detection areas 83 of opposing sensors 25, 27 may be positioned congruent with one another. The emission of electromagnetic waves by the emitters 91 of the sensors 25, 27 may be offset relative to one another in time in order to prevent the sensors from interfering with one another.

According to another option, the detection areas 83 of opposing sensors 25, 27 are spatially positioned offset to one another and the emission of electromagnetic waves by the emitters 91 of the sensors 25, 27 takes place simultaneously.

In another variation, the detection areas 83 of opposing sensors 25, 27 may be positioned congruent with one another and the emission of electromagnetic waves by the emitters 91 of the sensors 25, 27 may take place simultaneously. However, the electromagnetic waves have to differ from one another with respect to their frequency in this case and the receivers 89 have to comprise filters that are adapted in accordance with the frequency to be received.

Based on the aforementioned embodiments, the two opposing sensors 25, 27 can detect one or more users 81A-81F present in the pass-through zone 13 in an at least partially simultaneous manner. In this case, the time-of-flight measurement particularly also detects the respective distance of the passing user from the corresponding sensor 25, 27. The distances measured as a function of the time result in a signal profile of the sensors 25, 27 that is much easier to evaluate, for example, than images acquired by a camera, which have to be processed, e.g., by means of a 3D-capable image processing program. The evaluation accordingly requires significantly less computing power and data storage resources such that the evaluation of the simple distance signal profile can take place at lightning speed.

As already mentioned, the times-of-flight of the electromagnetic waves, which are emitted and once again received by two opposing sensors 25, 27, are detected by the sensors 25, 27 and forwarded to the signal evaluation unit in the form of sensor signals. In this context, it is irrelevant whether the sensor signals 85, 87 are forwarded in the form of a time-of-flight, a distance value, a numerical value or the like. It is merely important that changes in the signal profile of the sensor signals 85, 87 and an order of magnitude of the change (level of the amplitude) are detectable and forwarded. The signal patterns created by the signal profile can be analyzed in relation to a basic signal G in the signal evaluation unit 23, wherein a counter value 95 of a counting unit 93 of the signal evaluation unit 23, which is symbolically indicated in FIG. 3B, is changed in dependence on the analyzed signal patterns.

The sensor signals 85, 87 or measured values of the sensors 25, 27 are illustrated in the form of signal profiles in the Cartesian coordinate system according to FIG. 3B, wherein the progressing time t of the sensor signal acquisition is plotted on the axis of abscissas and the measured distance d, which is output by the sensor 25, 27 in the form of a sensor signal 85, 87, is plotted on the axis of ordinates. For purposes of illustration, the signal profiles of the sensor signals 85, 87 are slightly offset relative to one another along the axis of ordinates because they would otherwise lie on top of one another over wide areas. Such an offset would also occur, for example, if the user passes the pass-through zone not quite centrally. Three characteristic instances of user registrations are illustrated in an exemplary manner in FIG. 3A in order to elucidate the evaluation.

When no user 81A-81F is located in the detection area 83 of the opposing sensors 25, 27, these sensors measure the maximal distance d and therefore generate the continuous basic signal G for each sensor 25, 27. The sensor signals 85, 87 deviate from the basic signal G as soon as a user enters the detection area.

The first instance of such a registration concerns a single user 81A, who stands on the transport band 11 in the center of the pass-through zone 13. The signal profile of the two sensor signals 85, 87 is exactly identical when this user passes and/or rides through the detection areas of the sensors 25, 27 with a speed V, wherein the amplitudes of said sensor signals only reach a medial threshold range M. A numerical value 97 "one" (symbolically indicated with +1) can now be assigned to the first instance.

The second instance concerns two users 81B, 81C, who stand on the transport band 11 exactly adjacent to one another in the pass-through zone 13. In this case, the signal profile of the two sensor signals 85, 87 is also exactly identical when these users pass and/or ride through the detection areas 83 of the sensors 25, 27 with a speed V, but the amplitudes reach a lower threshold range U. A numerical value 97 "two" (symbolically indicated with +2) can now be assigned to the second instance.

The third instance concerns three users 81D, 81E, 81F, who stand on the transport band 11 in a staggered manner and closely adjacent to one another in the pass-through zone 13. The two sensor signals 85, 87 extend through the upper threshold range O, the medial threshold range M and the lower threshold range U in a step-like manner corresponding to the staggering and inversely to one another. A numerical value 97 "three" (symbolically indicated with +3) can now be assigned to the third instance. The third example also shows the signal profile of the sensor signals 85, 87 when a single user 81A-81F stands near one of the balustrades 15.

According to a summary of these three instances, the time-of-flight measurement of the sensors 25, 27 makes it possible to detect the presence of a user 81A-81F, as well as the distance d of this user from the detecting sensor 25, 27, and to determine the number of simultaneously registered users 81A-81F from the detected distances d of opposing sensors 25, 27 by means of an evaluation in the form of a comparison of the distance signal profiles.

The three above-described instances therefore have a characteristic signal pattern, which is typical for the corresponding lineup of users 81A-81F on the transport band 11. It goes without saying that it is possible to include a plurality of additional characteristic signal patterns, to which a unique numerical value 97 can be assigned.

An assignment can be achieved, for example, in that an analysis of the signal patterns is carried out by comparing the rising and/or falling sections of the two sensor signals 85, 87 to the upper threshold range O, to the medial threshold range M and to the lower threshold range U starting from the basic signal G. In other words, the analysis concerns the sections of the signal profile, which effect a penetration into one of the threshold ranges O, M, U. Since the medial threshold range M and the lower threshold range U are penetrated depending on the signal profile, the signal evaluation unit 23 preferably waits for the rising section before the counter value 95 is determined in accordance with the threshold range O, M, U reached.

For example, the counter value 95 of the counting unit 93 may in dependence on the comparison be
- increased by one if the first of the two sensor signals 85, 87 reaches the upper threshold range O and the second of the two sensor signals 85, 87 reaches the medial threshold range M or lower threshold range U;
- increased by one if the first and the second sensor signal 85, 87 reach the medial threshold range M; or
- increased by two if the first and the second sensor signal 85, 87 reach the lower threshold range U.

However, a pattern recognition algorithm may also be executed in the signal evaluation unit 23, wherein said pattern recognition algorithm analyzes the signal patterns, which are created by the signal profile of the sensor signals 85, 87 and separated from one another by signal profile sections on the level of the basic signal G.

Such a pattern recognition algorithm compares the identified signal profile sections to signal patterns stored in a database and assigns the corresponding stored signal pattern to the respective signal profile section of the sensor signals 85, 87. A numerical value 97 is assigned to the stored signal pattern. The counter value 95 of the counting unit 93 is now increased by this numerical value 97. It is obvious that very many different signal patterns are possible due to the speed with which the users pass the sensors 25, 27, as well as due to the shape of the users themselves. In order to cover this variety, these signal patterns can be analyzed by a machine learning algorithm. The pattern recognition algorithm may be designed similar to algorithms used for optical character recognition (OCR).

Furthermore, a pattern comparison algorithm may be executed in the signal evaluation unit 23 and, if the signal pattern deviates from the already stored signal patterns, the deviating signal pattern can likewise be stored as a signal pattern. A numerical value 97 is subsequently assigned to this signal pattern such that this numerical value 97 is used for increasing the counter value 95 of the counting unit 93 if this signal pattern once again corresponds to the signal profile of the sensor signals 85, 87.

For example, wear values determined in tests may be periodically taken as a basis for the existing counter value 95 such that the remaining service life of expendable parts such as bearings, rollers, chains, belts, guides and the like of the respective passenger transport system 1 can be determined from the existing counter value 95.

In order to prevent users from forming a compact block, the width of the zone 13 of the passenger transport system 1, through which the users 81A-81F can pass, may be limited to two users 81A-81F standing adjacent to one another in the region of the sensors 25, 27 as schematically illustrated in FIG. 3A with the two users 81B, 81C in the second instance.

Although the invention was described with reference to specific exemplary embodiments, it is obvious that numerous other embodiments can be realized in accordance with the present invention, e.g. by providing multiple pairs of sensors 25, 27 along the pass-through zone of a passenger transport system 1. In addition, other arrangements of the sensors relative to one another can be realized without the sensors interfering with one another.

In conclusion, it should be noted that terms such as "having," "comprising," etc. do not preclude any other elements or steps and that terms such as "a" or "an" do not preclude a plurality. It should furthermore be noted that characteristics or steps, which were described above with reference to one of the exemplary embodiments, can also be used in combination with other characteristics or steps of other above-described exemplary embodiments.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A passenger transport system with a device for registering users, the passenger transport system having a pass-through zone through which the users can pass, the device comprising:
    two sensors each operating in accordance with a time-of-flight measurement principle;
    a signal evaluation unit connected to the sensors;
    wherein each of the sensors includes at least one emitter emitting electromagnetic waves into a respective detection area and a receiver arranged adjacent to the emitter, the receiver receiving the electromagnetic waves emitted by the emitter and reflected from the detection area;
    wherein the emitter and the receiver of each of the sensors are directed into the pass-through zone and the detection area is a three-dimensional space that has a principal direction axis;
    wherein the sensors are arranged on opposing sides of the pass-through zone and the principal direction axes of the detection areas are arranged parallel to one another and orthogonal to a longitudinal extent of the pass-through zone;
    wherein each of the sensors detects a presence of a user, as well as detects a distance of the user from the sensor, and outputs a corresponding distance signal profile; and
    wherein the signal evaluation unit determines a number of simultaneously detected users by evaluating a comparison of the distance signal profiles with a predetermined basic signal, including determining one user when both of the distance signal profiles simultaneously drop below the basic signal and at least one of the distance signal profiles falls in a medial or upper distance range, and determining two users when both of the distance signal profiles simultaneously drop below the basic signal to a lower distance range.

2. The passenger transport system according to claim 1 wherein a width of the zone through which the users can pass is limited to two of the users standing adjacent to one another in a region of the sensors.

3. The passenger transport system according to claim 1 wherein the passenger transport system is an escalator or a moving walkway, wherein the pass-through zone is laterally bounded by balustrades, and wherein the sensors are arranged on or in the balustrades.

4. The passenger transport system according to claim 1 wherein the passenger transport system is an elevator, wherein the pass-through zone is laterally bounded by a door frame of the elevator, and wherein the sensors are arranged on or in the door frame.

5. The passenger transport system according to claim 1 wherein the detection areas are positioned congruent with one another and the emissions of the electromagnetic waves by the emitters are offset relative to one another in time.

6. The passenger transport system according to claim 1 wherein the detection areas are positioned offset relative to one another and the emissions of the electromagnetic waves by the emitters take place simultaneously.

7. The passenger transport system according to claim 1 wherein the detection areas are positioned congruent with one another and the emissions of the electromagnetic waves take place simultaneously, wherein the electromagnetic waves from the emitters differ from one another with respect to frequency and the receivers include filters adapted in accordance with the frequency to be received.

8. A method for registering users of a passenger transport system, the method comprising the steps of:
    providing a device for registering users including two sensors each operating in accordance with a time-of-flight measurement principle and a signal evaluation unit connected to the sensors, where the sensors are arranged on opposing sides of a user pass-through zone, and where each of the sensors includes at least one emitter emitting electromagnetic waves into a respective detection area and a receiver arranged adjacent to the emitter, the receiver receiving the electromagnetic waves emitted by the emitter and reflected from the detection area;
    detecting a time-of-flight of the electromagnetic waves that are emitted and then received by the sensors;
    forwarding the detected time-of-flight of the electromagnetic waves the signal evaluation unit as sensor signals;
    evaluating signal patterns created by a distance signal profile of the sensor signals by analyzing the signal patterns in relation to a basic signal; and
    determining a number of simultaneously registered users from the distances detected by the sensors from the evaluation of the signal patterns and changing a counter value of a counting unit of the signal evaluation unit in dependence on the determined number, including determining one user when both of the distance signal profiles simultaneously drop below the basic signal and at least one of the distance signal profiles falls in a medial or upper distance range, and determining two users when both of the distance signal profiles simultaneously drop below the basic signal to a lower distance range.

9. The method according to claim 8 including executing a pattern recognition algorithm in the signal evaluation unit to analyze the signal patterns of the signal profiles in relation to the basic signal, and wherein an analysis result of a stored signal pattern is assigned to a numerical value, and wherein the counter value of the counting unit is increased by the numerical value in response to the analysis result.

10. The method according to claim 9 including executing a pattern comparison algorithm in the signal evaluation unit and, if the signal pattern deviates from the stored signal patterns, the deviating signal pattern is stored as another signal pattern with an assigned numerical value.

* * * * *